Patented July 11, 1950

2,515,163

UNITED STATES PATENT OFFICE 2,515,163

MANUFACTURE OF SUPERPHOSPHATE FERTILIZER

Albert C. Mohr, Arcadia, Calif., assignor to Stauffer Chemical Company, a corporation of California No Drawing. Application November 20, 1948, Serial No. 61,300

1 Claim. (Cl. 71—37)

This invention relates to the manufacture of superphosphate fertilizers from calcium phosphate rock.

The so-called phosphate rock from which superphosphates are manufactured contains silica and calcium fluoride. When the rock is acidulated with sulfuric acid, the calcium fluoride is decomposed and forms volatile silicon fluoride; release of this to the atmosphere may provide a problem of pollution. Additionally, the loss of silicon fluoride represents a waste of sulfuric acid inasmuch as, in accordance with this invention, the silicon fluoride can be suitably processed and utilized to acidulate additional rock and provide additional fertilizer. I have found that the silicon fluoride formed in the acidulation of the rock can be absorbed in water, preferably cold water, to form a solution containing up to as much as 30% by weight of hydrofluosilicic acid. This solution can then be added to additional phosphate rock to form additional calcium acid phosphate and calcium silico-fluoride. The hydrofluosilicic acid solution, when added to the rock, forms a thin slurry-like mixture. I have found that this can be added to acidulated rock made in the ordinary manner which has "set up" to some extent and that, when this is done, the excess water is taken up by the previously acidulated rock and does not interfere with the manufacture of the fertilizer nor affect deleteriously the product quality. The hydrofluosilicic acid solution should be added to the rock rather than to the sulfuric acid used for acidulation of the main body of the rock inasmuch as addition of the hydrofluosilicic acid to the sulfuric acid causes the former to decompose undesirably.

It is in general a broad object of the present invention to provide a process for the manufacture of superphosphate fertilizer in which the silicon tetrafluoride liberated is utilized successfully for the manufacture of additional superphosphate fertilizer.

As illustrative of practice of the invention, a suitably ground Idaho phosphate rock was mixed with 72.5% $H_2SO_4$ at 125° F. in the ratio of 1200 pounds of the rock to 700 of the acid (100%) and discharged as mixed into a continuous den. The silicon tetrafluoride evolved was absorbed in cold water (80° F.) to provide a 30% solution. The solution, at 80° F., was in turn mixed with finely ground unreacted rock and the thin slurry-like mixture discharged on the acidified rock at a point whereat the acidified rock was substantially free of unreacted acid, e. g. at a point whereat the sulfuric acid acidulated rock had been in the den for about five minutes. The proportion of the slurry feed to the acidified rock feed was approximately one to twenty-seven. The mixture remained in the den for about twenty minutes, at usual den temperatures, after which it was discharged, cured and dried in the usual manner. The resulting superphosphate analyzed as follows:

|  | Per cent |
|---|---|
| Total $P_2O_5$ | 20.44 |
| Insoluble | 2.07 |
| $P_2O_5$ available | 18.37 |
| Moisture | 4.20 |

One can, of course, utilize a silicon tetrafluoride solution in water which contains less than 30% hydrofluosilicic acid, and I have successfully utilized solutions containing as little as 15% of hydrofluosilicic acid. However, generally the more concentrated the hydrofluosilicic acid, the less likelihood there is for the water present to affect adversely the denning, curing and drying of the superphosphate. In place of ordinary sulfuric acid one can employ sludge acid or a mixture of ordinary sulfuric acid and sludge acid, as in Patent 2,418,203.

I claim:

In a conventional den process for the manufacture of finely divided superphosphate fertilizer from phosphate rock, the steps comprising mixing together finely divided phosphate rock and sulfuric acid to acidulate the rock and release silicon tetrafluoride therefrom, placing the sulfuric acid acidulated rock in a den to complete the reaction between the acid and the rock, absorbing the silicon tetrafluoride in water to form a solution of hydrofluosilicic acid, mixing together additional finely divided phosphate rock with the so-formed hydrofluosilicic acid solution to form a slurry-like mixture and acidulate the rock, then adding the slurry-like mixture to sulfuric acid acidulated rock previously placed in the den and which is substantially free of unreacted sulfuric acid, and reacting the so-formed mixture in the den at normal den temperature until a pulverulent mass is formed.

ALBERT C. MOHR.

REFERENCES CITED

The following references are of record in the file of this patent:

UNITED STATES PATENTS

| Number | Name | Date |
|---|---|---|
| 1,297,464 | Hechenbleikner | Mar. 18, 1919 |
| 1,313,379 | Hechenbleikner | Aug. 19, 1919 |
| 2,312,048 | Penfield | Feb. 23, 1943 |